United States Patent [19]

Lindenthal et al.

[11] Patent Number: 4,834,692
[45] Date of Patent: May 30, 1989

[54] UNIVERSAL JOINT FOR USE WITH SHAFTING

[76] Inventors: Hans Lindenthal, Kistelbeegstr. 81; Peter Babik, Stuttgarter Ring 76, D-7920 Heidenheim, Fed. Rep. of Germany

[21] Appl. No.: 77,304

[22] Filed: Jul. 24, 1987

[30] Foreign Application Priority Data

Jul. 29, 1986 [DE] Fed. Rep. of Germany ....... 3625637

[51] Int. Cl.$^4$ .............................................. F16D 3/40
[52] U.S. Cl. ....................................... 464/136; 403/12
[58] Field of Search ....................... 403/11, 12, 15, 57; 464/26, 112, 117, 118, 134, 136

[56] References Cited

U.S. PATENT DOCUMENTS

| | | | |
|---|---|---|---|
| 4,124,999 | 11/1978 | Hirasawatsu et al. | 464/182 X |
| 4,195,495 | 4/1980 | Sehlbach et al. | 464/117 |
| 4,300,361 | 11/1981 | Lindenthal et al. | 403/57 X |
| 4,333,319 | 6/1982 | Bischoff | 464/136 X |

FOREIGN PATENT DOCUMENTS 239721 3/1969 U.S.S.R. .............................. 464/136

Primary Examiner—Daniel P. Stodola
Attorney, Agent, or Firm—Grimes & Battersby

[57] ABSTRACT

A universal joint for shafting, and more particularly for rolling mills, with a device for suppressing pivoting of the joint is provided. For this purpose there is provided an axially yielding element, preferably in the form of a piston and cylinder unit driven by fluid pressure, in one joint fork. The device includes piston and cylinder unit which acts on an element which is connected with one of the other moving means of the universal joint. This other means can be either a rod secured to the other joint fork or a web-like plate between the bearing eyes of the other joint fork. It is also possible for the other movable member to be in the form of a rod, which acts through the crosspiece of the universal joint on a mating surface in the other joint fork. If the spherical surface is located on the crosspiece itself, there is then the possibility of preventing the free joint end from flopping downwards while nevertheless being able to pivot in a horizontal plane.

10 Claims, 4 Drawing Sheets

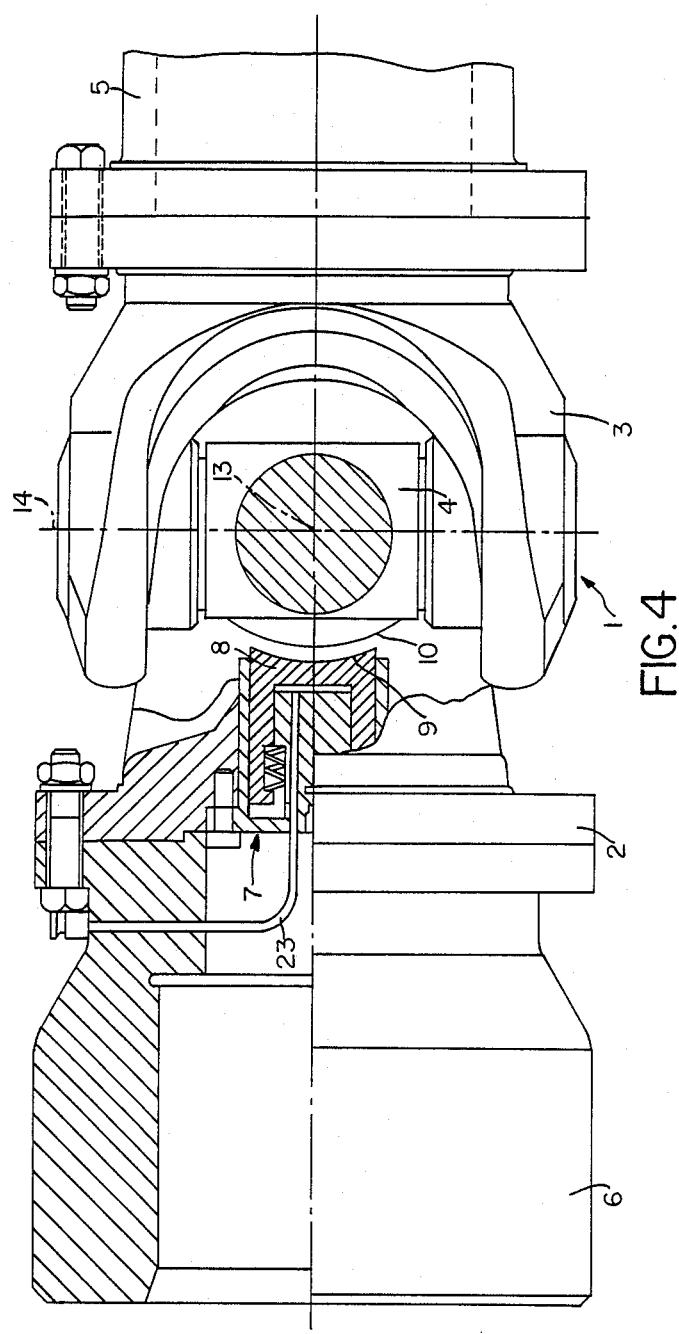

UNIVERSAL JOINT FOR USE WITH SHAFTING

The invention relates to a universal joint for a shaft for connecting two rotatably supported machine elements. Such a universal joint has been previously proposed in the German Pat. No. 2,825,556.

Shafts fitted with such universal joints are required to drive of some heavy duty machinery, as for example rolling mills, as well as in other applications. The power and torque to be transmitted in such cases lead to designs with substantial sizes and weights. On the other hand the frequent changing of the rolls necessary in rolling mills leads to extensive assembly disassembly operations. Such operations may be substantially facilitated if the universal joint shaft end, or driving fittment placed around the one roll trunnion, keeps to the previously assumed level and angle during roll changing, that is to say it does not flop downwards.

To serve this purpose the universal joint in accordance with the German Pat. No. 2,825,556 has a spring-extended telescoping rod running through the crosspiece of the universal joint and urging the two universal joint forks towards each other so that the universal joint always has the tendency to assume its extended position. In a further design the known retaining means only takes effect when the adjacent part of the machinery, as for example the roll, is removed from the universal joint. During normal operation the angle of bending of the universal joint is not restricted. However,this known device for preventing bending suffers from the disadvantage that the centrally arranged spring is not able to be so strong as to hold a very heavy universal joint half in the desired assembly setting. There is a further shortcoming as regards the wear-prone components running on each other during operation.

The German Pat. No. 2,733,942 which corresponds to U.S. Pat. No. 4,124,999 to Hirasawatus, et al., which issued on Nov. 14, 1978 has proposed a type of universal joint in which a centrally placed core pin extends form the one universal joint fork through the crosspiece and into the other universal joint fork. In this second universal joint half there is a ring with a conical hole which may be slipped over an actuating cylinder in an axial direction over the end of the core pin which is also conical. Although this contrivance makes it possible for the freely hanging universal joint half to be securely supported, the position in which it is held is only the fully extended one so that if the roll is to be changed while the shaft is in the bent position this system is not applicable.

The German Pat. No. 2,926,710 describes a universal joint in which in addition the two universal joint forks are connected by a rod extending through the crosspiece of the joint. The one end of this rod articulates with a disk which for its part is able to move in a plane perpendicular to the axis of the coupling and may be retained by a fluid pressure acting on a piston. This construction is very elaborate and has a large number of parts which are liable to be fouled by dirt from the outside and to be worn.

Accordingly one object of the present invention is to devise a universal joint with a simple but nevertheless reliable retaining means with which disconnected universal joint forks may be retained in any desired position without restricting mobility in the non-actuated state.

In order to achieve this object the invention is defined herein the piston and cylinder unit is centrally located in the one universal joint fork, with a member able to be moved towards the center of the universal joint and which on actuation of the piston and cylinder unit with fluid under pressure is urged against the end surface of a further member, which for its part is attached to one of the other elements of the universal joint. Both the end surface of the movable member of the piston and cylinder unit and also the end surface of the other member are spherical in form, the center of curvature of their curved surfaces coinciding with the center point of the universal joint. Contact between the axially movable member of the piston and cylinder unit and the corresponding opposite surface only takes place after a certain displacement has occurred, whereas in the non-actuated position free mobility of the two joint forks is ensured. The system for preventing twisting or flopping downwards of the one free joint half is due to frictional engagement between the surfaces in contact with each other under the action of the pressure in the piston and cylinder unit.

A preferred form of the invention is defined as having a spherically designed end surface of the movable member of the piston an cylinder unit which is opposite to a spherical end surface of a rod which is secured in the other half of the joint and extends through a hole in the crosspiece to the other side thereof. It is possible for the spherical surface for the movable member of the piston and cylinder unit to be formed on a web-like plate which is secured to the end sides, directed towards the one joint fork, of bearing eyes in the other joint fork. In this form of the invention it is possible to utilize a crosspiece without any central hole. Furthermore it is possible for the movable member of the piston and cylinder unit to be in the form of a rod, which extends through a hole provided in the crosspiece and abuts against a corresponding spherical opposing surface on the base of the other joint fork. In accordance with a still further feature of the invention, on its side facing the piston and cylinder unit the crosspiece may be provided with a spherical surface for the movable member of the piston and cylinder unit to press against. The advantage of this form of the invention is that, in a given rotational position of the joint shaft, the free joint may be prevented from flopping downwards past the crosspiece, whereas the free mobility is nevertheless ensured in the horizontal plane for fitting and assembly operations.

Some working examples of the invention will now be described with reference to the accompanying drawings.

FIG. 4 shows a universal joint with s spherical mating surface on the crosspiece of the joint.

In all figures like parts are denoted by like reference numerals.

Figure 1:
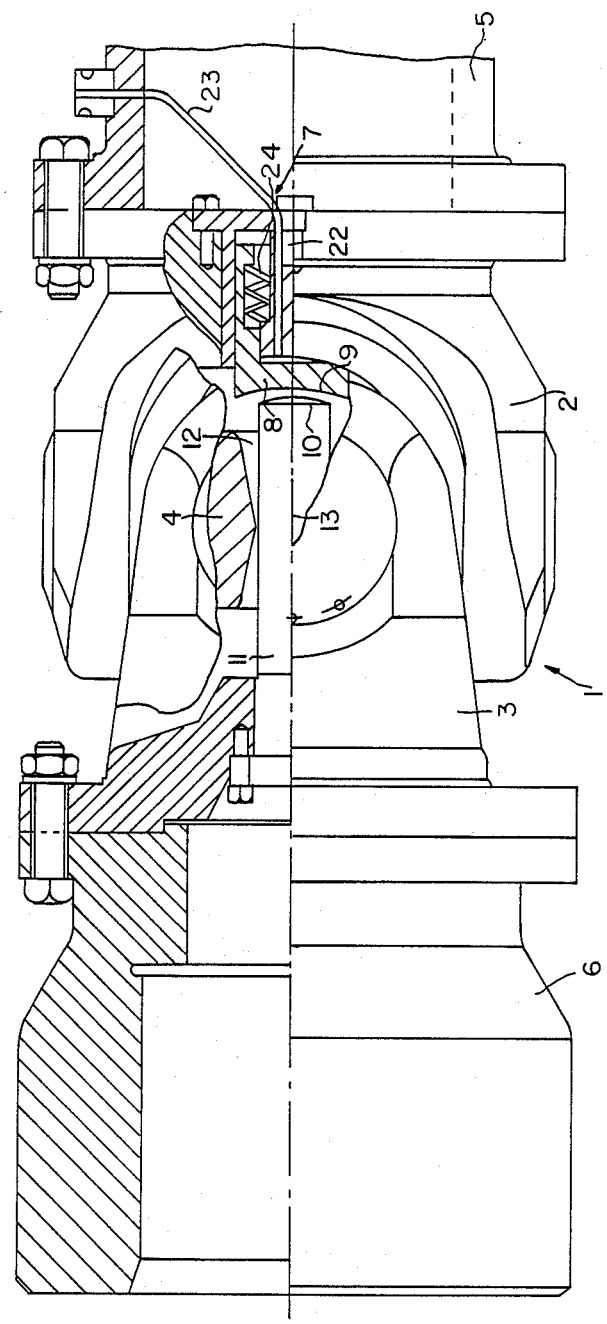
FIG. 1 shows a universal joint with a spherical mating surface on the rod extending through the crosspiece of the universal joint, the rod being attached to the opposite joint fork.

FIG. 1 shows a universal joint 1 consisting of a first joint fork 2, which is attached to a shaft 5, a second joint fork 3 with the attachment fixture 6 thereon and a crosspiece 4 connecting the two joint forks together. The joint fork 2 has a piston and cylinder unit 7 centrally located on the axis of the coupling and having a movable member 8 which may be moved towards the center point 13 of the joint by the supply of fluid under pressure through a feed duct 23. The other or second joint fork 3 has a centrally arranged rod 11 which extends through a hole 12 in the crosspiece 4 as far as point near the end surface of the movable member 8 of the piston and cylinder unit 7 without, however, contacting the same in the non-actuated state as illustrated. Both the end surface 10 of the rod 11 as well as the end surface 9 of the movable member 8 are made spherical, the two contacting surfaces 9 and 10 having the same radius of spherical curvature, whose center point coincides with the center point 13 of the universal joint 1. On the supply of fluid under pressure via the duct 23 to the piston and cylinder unit 7 the movable member 8 is urged by way of the spherical end surface firmly against the end surface 10 of the rod 11. As a result of the frictional forces existing between the contacting surfaces the joint fork 3 is retained in its instantaneous position. If the roll, not shown, is now withdrawn from the attachment fixture 6, the shaft end of the new roll, which is not inserted, will engage the fixture 6 in the exact position for assembly. The pressure in the feed or fluid supply duct 23 may now be let off so that the movable member 8 may be shifted into the non-actuated state with the aid of a return spring provided for this purpose. The joint forks 2 and 3 are then free to move again. In the piston and cylinder unit 7 the movable member 8 is designed in the form of a cylinder able to slide in relation to a stationary piston 22. This offers the advantage that the sealing surfaces subject to high pressures between the cylinder and the piston are arranged on the inner side so that the outer surface of the movable member 8 is only a running or guiding surface and only has to be sealed off sufficiently to prevent the access of dirt thereto. The return tension spring 24 is in the form of a belleville washer, but another type of spring would also do.

Figure 2:
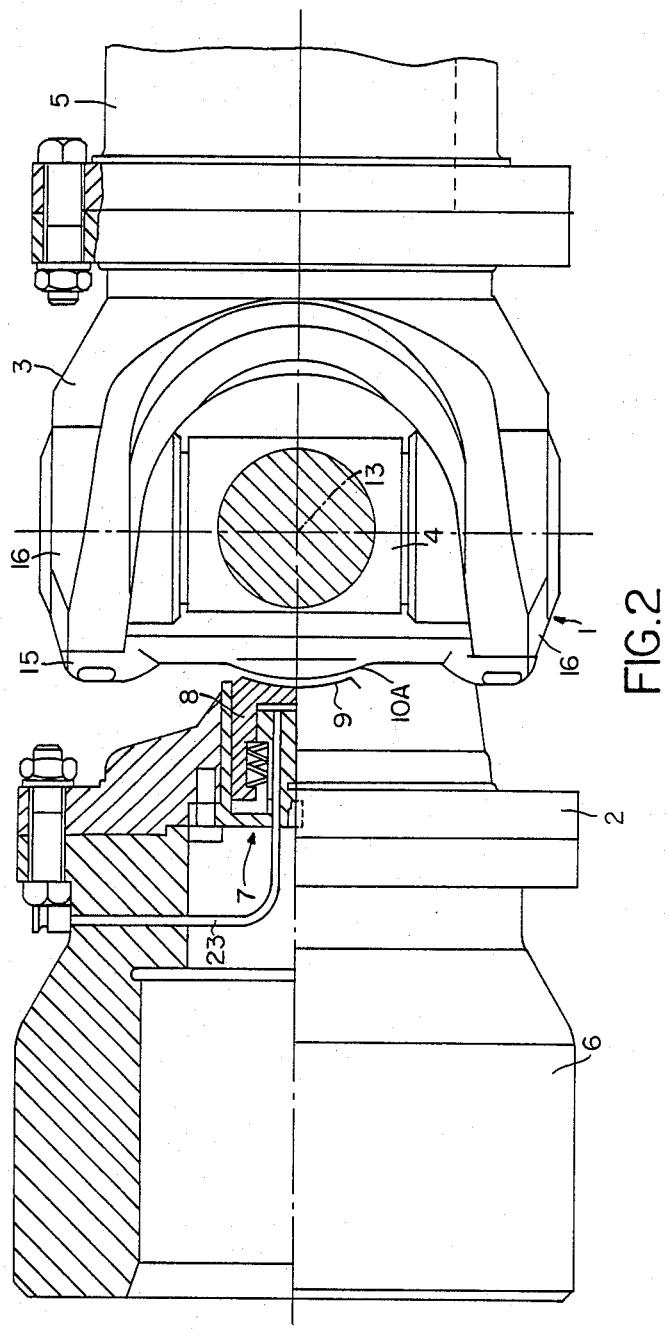
FIG. 2 shows a universal joint with a mobile rod and a spherical mating surface on the other joint fork.

The universal joint shown in FIG. 2 has its one joint fork 2, which is fitted with the piston and cylinder unit 7, connected with the attachment fixture 6, whereas the other joint fork 3 is secured to the shaft 5. The spherical end surface 9 of the movable member 8 is opposite to a spherical mating surface 10a which is provided on a web-like plate 15. This web-like plate 15 constitutes a bridge between the end surfaces, facing the one joint fork 2, of the bearing eyes 16 (located on the other joint fork 3) provided to accept the bearings for the crosspiece 4. The center point of the spherical surface 10a on the web-like plate 15 again coincides with the center point 13 of the universal joint. This design makes possible the use of a trunnioned crosspiece without a central hole. The arrangement of the piston and cylinder unit 7 in the first joint fork 2 connected with the attachment fixture offers the advantage that any servicing and fitting operations needed on the piston and cylinder unit may be undertaken with the roll (not shown) removed from the open side of the attachment fixture.

Figure 3:
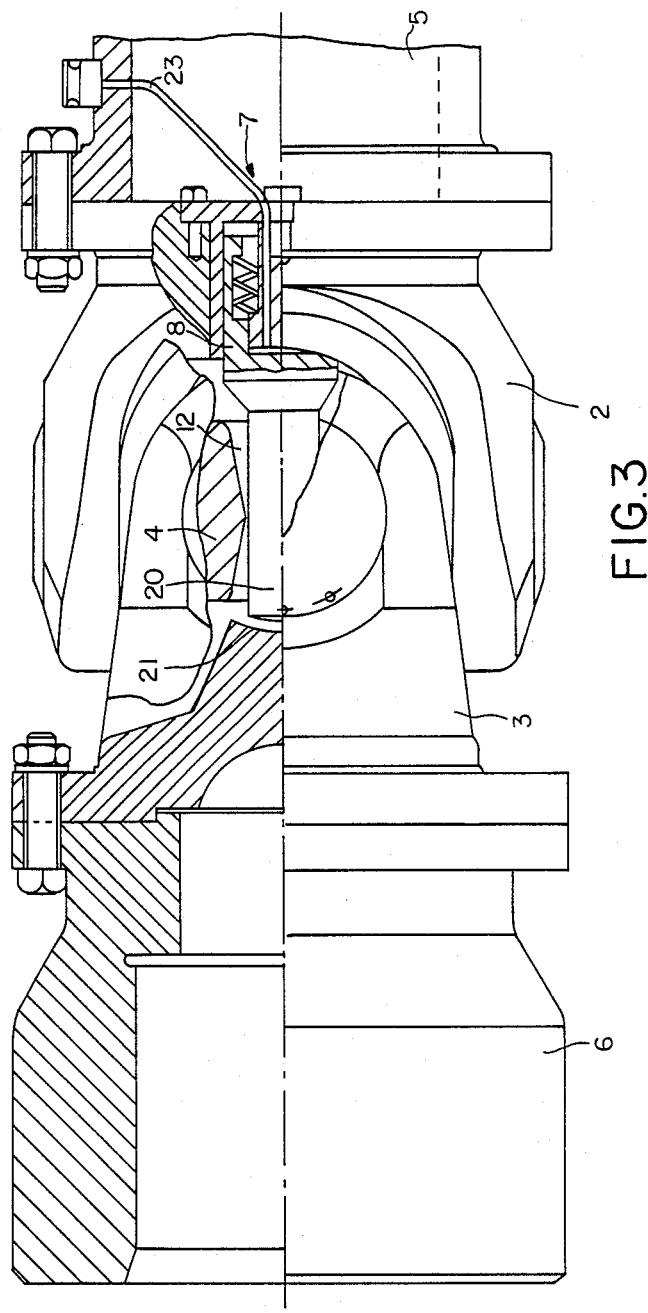
FIG. 3 shows a universal joint with a movable rod and a spherical mating surface on the other joint fork.

In the embodiment of the invention illustrated in FIG. 3 the movable member 8 of the piston and cylinder unit 7 arranged in the first joint fork 2 is designed in the form of a rod 20, extends through a hole 12 in the crosspiece 4 and acts on a spherical mating surface 21 on the second joint fork 3.

FIG. 4 shows a further embodiment of the invention in which the spherical surface 10 which mates with the end surface 9 of the movable member 8 is not provided on a means connected with the other joint fork 3 but directly on the side, facing the piston and cylinder unit 7, of the crosspiece 4. If for instance prior to pulling off the roll (not shown) from the attachment fixture 6 the universal joint 1 is moved into the rotational position shown and the movable member 8 is urged onto the spherical surface 10 by fluid pressure supplied via the duct 23, then although the one joint fork 2 with the attachment fixture 6 is prevented by the friction between the surfaces 9 and 10 from flopping downwards, this does not cause a licking effect between the two joint forks 2 and 3 in the other plane. In fact the one joint fork 2 with the attachment fixture 6 may be swung about the vertical axis 14 in the horizontal plane by means of the crosspiece bearings of the joint fork 3. This arrangement also involves certain advantages, more especially as regards the servicing and repair of the attachment fixture 6 or of the piston and cylinder unit 7 able to be accessed through it.

We claim:

1. A universal joint for a shaft which connects two rotatable supported machine elements of a machine plant comprising:

a central crosspiece; and a first fork and a second fork, said first and said second forks pivotable connected together by said central crosspiece, said first fork adapted to be attached to the shaft and having arranged thereon a piston and cylinder unit actuated by fluid under pressure for preventing pivoting of said first and said second forks when said universal joint is in a mounted condition, said piston and cylinder unit having a movable member which is adapted to slide towards the center point of the universal joint even when said universal joint is in the mounted condition, said movable member having a spherical end surface;

said second fork having a spherical end surface which is adapted to mate with said spherical end surface of said movable member, wherein said spherical end surface of said movable member and said spherical end surface of said second fork each has a center of curvature which coincides with the center point of the universal joint.

2. The universal joint of claim 1, wherein said second fork has a rod secured thereto, said rod has an end surface which is said spherical end surface of said second fork, and wherein said crosspiece has a central hole through which said rod extends 3. The universal joint of claim 1, wherein said second fork has a web-like plate upon which has located thereon said spherical end surface of said second fork.

4. The universal joint of claim 1, wherein said movable member is a member rod, wherein said crosspiece has a hole through which said member rod extends, and wherein said spherical end surface of said second fork is located at the bottom of said second fork.

5. The universal joint of claim 1, wherein said piston and cylinder unit is located on a side of said first fork and said side of said first fork is turned away from the center point of the universal joint.

6. The universal joint of claim 1, wherein said spherical end surface of said movable member and said spherical end surface of said second fork each has the same radius of curvature.

7. The universal joint of claim 1, wherein said movable member is a cylinder of said piston and cylinder unit and said piston and cylinder unit has a fixed piston upon which said cylinder slides.

8. The universal joint of claim 1, further including a return spring connected to said piston and cylinder unit and adapted to move said movable member into an inoperative position.

9. A universal joint for a shaft which connects two rotatable supported machine elements of a machine plant comprising:
- a central crosspiece having a spherical mating surface ; and
- a first fork and a second fork, said first and said second forks pivotable connected together by said central crosspiece, said first fork adapted to be attached to the shaft and having arranged thereon a piston and cylinder unit actuated by fluid under pressure for preventing pivoting of said first and said second forks when said universal joint is in a mounted condition, said piston and cylinder unit having a movable member which is adapted to slide towards the center point of the universal joint, said movable member having a spherical end surface which mates with said spherical end surface of said crosspiece.

10. A universal joint for a shaft which connects two rotatable supported machine elements of a machine plant comprising:
- a central crosspiece;
- a first fork and a second fork, said first and said second forks pivotable connected together by said central crosspiece, said first fork adapted to be attached to the shaft and having arranged thereon a piston and cylinder unit actuated by fluid under pressure for preventing pivoting of said first and said second forks when said universal joint is in a mounted condition, said piston and cylinder unit having a movable member which is adapted to slide towards the center point of the universal joint, said movable member having a spherical end surface; and
- a plate attached to said second fork, said plate having a spherical surface which is adapted to mate with said spherical end surface of said movable member.

* * * * *